US012729265B2

(12) United States Patent
Urraca et al.

(10) Patent No.: US 12,729,265 B2
(45) **Date of Patent: *Sep. 8, 2026**

(54) POLYURETHANES FROM DEPOLYMERIZED LIGNIN CONTAINING LIGNIN MONOMERS

(71) Applicant: VITO NV, Mol (BE)

(72) Inventors: Ortiz Pablo Urraca, Mol (BE); Richard Vendamme, Mol (BE)

(73) Assignee: VITO NV, Mol (BE)

( * ) Notice: Subject to any disclaimer, the term of this patent is extended or adjusted under 35 U.S.C. 154(b) by 928 days.

This patent is subject to a terminal disclaimer.

(21) Appl. No.: 17/917,111

(22) PCT Filed: Apr. 6, 2021

(86) PCT No.: PCT/EP2021/058922

§ 371 (c)(1),
(2) Date: Oct. 5, 2022

(87) PCT Pub. No.: WO2021/204790

PCT Pub. Date: Oct. 14, 2021

(65) Prior Publication Data

US 2023/0235111 A1 Jul. 27, 2023

(30) Foreign Application Priority Data

Apr. 7, 2020 (EP) .................................... 20168403

(51) Int. Cl.
*C08G 18/40* (2006.01)
*C08G 18/48* (2006.01)
(Continued)

(52) U.S. Cl.
CPC ..... *C08G 18/4081* (2013.01); *C08G 18/4825* (2013.01); *C08G 18/4854* (2013.01);
(Continued)

(58) Field of Classification Search
CPC ............................ C08G 18/6492; C08G 18/00
See application file for complete search history.

(56) References Cited

U.S. PATENT DOCUMENTS

2016/0145285 A1 5/2016 Garbark et al.
2017/0121458 A1 5/2017 Garbark et al.

FOREIGN PATENT DOCUMENTS

JP 2009019081 A * 1/2009 ............. C08G 18/40
WO WO-2016056552 A1 * 4/2016 ............. C08G 18/00
WO 2018205020 A1 11/2018

OTHER PUBLICATIONS

Lee et al. Introduction of Reversible Urethane Bonds Based on Vanillyl Alcohol for Efficient Self-Healing of Polyurethane Elastomers, Molecules 2019, 24, 2201. (Year: 2019).*

(Continued)

*Primary Examiner* — David J Buttner
*Assistant Examiner* — Surbhi M Du
(74) *Attorney, Agent, or Firm* — DINSMORE & SHOHL LLP

(57) ABSTRACT

In general the present invention relates to polyurethanes based on the reaction of (a) a disocianate composition with (b) depolymerized lignin containing lignin-derived monomers, or the products of their respective functionalization; (c) a polyol composition, if desired (d) chain extenders, if desired. (e) additives, if desired. More specifically, this process relates to the use of depolymerized lignins containing varying amounts of 4-hydroxylalkylphenols or 4-alkylphenols and their derivatives. The polyurethanes can be partially or fully bio-based. Furthermore, the invention relates to a method for preparing these polyurethanes and to their use.

19 Claims, 2 Drawing Sheets

(51) Int. Cl.
*C08G 18/64* (2006.01)
*C08G 18/72* (2006.01)
*C08G 18/73* (2006.01)
*C08G 18/76* (2006.01)

(52) U.S. Cl.
CPC ....... *C08G 18/6492* (2013.01); *C08G 18/724* (2013.01); *C08G 18/73* (2013.01); *C08G 18/7664* (2013.01)

(56) References Cited

OTHER PUBLICATIONS

International Search Report and Written Opinion mailed Jun. 22, 2021 in reference to co-pending Application No. PCT/EP2021/058922 filed Apr. 6, 2021.
Li, et al. "Preparation and characterization of bio-polyol and bio-based flexible polyurethane foams from fast pyrolysis of wheat straw", Industrial Crops and Products, vol. 103, pp. 64-72, 2017.
Schutyser, et al., "Influence of bio-based solvents on the catalytic reductive fractionation of birch wood", RCS, Green Chemistry, vol. 17, No. 11, Sep. 3, 2015 (Sep. 3, 2015), pp. 5035-5045, XP055730627.
Zhang, et al., "Recent Advances on Ligin-Derived Polyurethane Polymers", Rev. Adv. Matter Sci., vol. 40, pp. 146-154, 2015.
Feghali, et al., "Thermosetting Polymers from Lignin Model Compounds and Depolymerized Lignins", Topics in Current Chemistry, vol. 376, No. 32, pp. 1-25, 2018.
Schutyser, et al., "Chemicals from lignin: an interplay of lignocellulose fractionation, depolymerization, and upgrading", Chem. Soc. Rev., vol. 47, pp. 852-908, 2018.
Sun, et al., "Bright Side of Lignin Depolymerization: Toward New Platform Chemicals", Chemical Reviews, vol. 118, pp. 614-678, 2018.
Van Den Bosch, et al., "Reductive lignocellulose fractionation into soluble lignin-derived phenolic monomers and dimers and processable carbohydrate pulps", Energy & Environmental Science, vol. 8, pp. 1748-1763, 2015.
Zhao, et al., "Sustainable Aromatic Aliphatic Polyesters and Polyurethanes Prepared from Vanillin-Derived Diols via Green Catalysis", Polymers, vol. 12, pp. 1-15, 2020.

* cited by examiner

POLYURETHANES FROM DEPOLYMERIZED LIGNIN CONTAINING LIGNIN MONOMERS

CROSS REFERENCES TO RELATED APPLICATIONS

This application is a national-stage application under 35 U.S.C. § 371 of International Application No. PCT/EP2021/058922, filed Apr. 6, 2021, which International Application claims benefit of priority to European Patent Application No. 20168403.2, filed Apr. 7, 2020.

FIELD OF THE INVENTION

In general the present invention relates to polyurethanes based on the reaction of (a) a di-isocyanate composition with (b) a depolymerized lignin composition containing lignin-derived monomers, or the products of their respective functionalization; (c) a polyol composition if desired, (d) one or more chain extenders if desired, and one or more (e) additives if desired. More specifically, this process relates to the use of depolymerized lignins containing varying amounts of 4-hydroxylalkylphenols or 4-alkylphenols and their derivatives. The polyurethanes of this invention can be partially or fully bio-based. Furthermore, the invention relates to a method for preparing these polyurethanes and to their use.

BACKGROUND

Polyurethanes are widely used polymers for applications such as coatings, molded articles, foams (rigid and flexible), sealants and synthetic fibers, among others. Current synthetic polyurethanes are the result of the reaction between di- or poly-isocyanates and monomers containing hydroxyl group, e.g. a diol, triol or polyol.

Lignin is the second largest biopolymer on earth, second only to cellulose. However, contrary to the latter, lignin is not currently valorized. Due to its high content of hydroxyl groups (both aliphatic and aromatic), it has been pursued as polyol replacement in polyurethane synthesis (*Rev. Adv. Mat. Sci.* 2015, 40, 146-154). However, lignins derived from cellulose isolation, also known as technical lignins, have a high molecular weight and polydispersity due to the condensation reactions that take place in the harsh reaction conditions of cellulose isolation. As a result, these type of lignins typically lead to poor performance polymers.

Depolymerization or fractionation of lignin on the other hand allows to obtain low molecular weight oligomers, with increased hydroxyl functionality, which results in polyurethane polymers with improved properties. Several scientific articles and patent publications have described this concept (*Top Curr Chem,* 2018, 373: 32; RCS, GREEN CHEMISTRY, 2015, Vol. 17, No. 11, 5035-5045 and WO2018205020A1). US20160145285A1 and US20170121458A1 disclose chemical modification of depolymerized lignin prior to their use in polyurethane synthesis.

Despite the advantages of depolymerized lignin over non-depolymerized lignin, still most depolymerization protocols use high temperatures and acidic/basic media, which results in low yields of monomers. Recently, new technologies have been developed that allow obtaining lignin oils containing monomers which originate from lignin in good yields and selectivity, based on mild fractionation and/or depolymerization conditions and strategies to stabilize the intermediates formed during depolymerization (*Chem. Rev.*

2018 118, 614; *Chem. Soc. Rev.* 2018, 47, 852). These monomers can be divided into two main categories depending on the alkyl chain terminal group: 4-alkylphenols and 4-hydroxylalkylphenols. Besides monomers, the depolymerized lignin oil contains low molecular weight dimers and oligomers. Although the precise structure of each of the component is still unknown, several have been characterized (*Energy Environ. Sci.,* 2015, 8, 1748).

The present invention is directed to the use of depolymerized lignin oils containing 4-hydroxyalkylphenols and/or 4 alkylphenols (Formula Ia), and/or their functionalized derivatives (Formula Ib), commonly represented as the lignin-derived monomers of Formula I, in polyurethane synthesis.

Lignin-derived monomers

Formula I

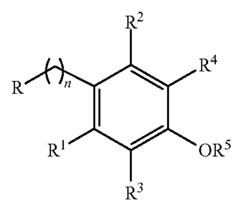

Wherein:

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$alkyl; more in particular H or $OCH_3$;

$R^5$ represents H or hydroxyalkyl; in particular hydroxy-$C_{1-12}$alkyl; and n=0-3.

Formula Ia

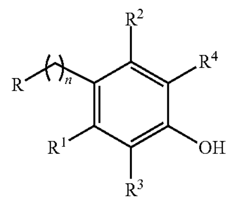

4-hydroxyalkylphenols (R = OH)
4-alkylphenols (R = $CH_3$)

Formula Ib

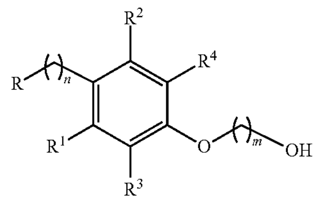

Functionalized 4-hydroxyalkylphenols (R = OH)
Functionalized 4-alkylphenols (R = $CH_3$)

Wherein:

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$ alkyl; more in particular H or $OCH_3$;

n=0-3; and m=1-12

Depolymerization of lignin leads to lignin oils with variable amounts of monomers, from <5% to up to 50% weight. The monomer content can be further increased by extraction and separation processes. Depending on the percentage of monomer in the mixture, the properties of the polyurethane formed from them will differ. The lower the percentage of monomer, the more cross-linked the polyurethane will be, yielding thermosetting polymers. With higher percentages of monomer there will be less cross-linkage thus having an elastomeric/rubber behavior. With very high percentages of monomer (>90-95%) the polyurethane could even be a thermoplastic polyurethane. Thus, adjusting the monomer content in the depolymerized lignin allows to tune the properties of a polyurethane produced therefrom.

The monomers in the depolymerized lignin oil will play the role of chain extenders in polyurethane synthesis, while the other components (dimers, trimers and oligomers) of the depolymerized lignin oil will act as cross linkers. The use of depolymerized lignin oil accordingly allows a great degree of replacement of petroleum derived diols, up to fully replacing the polyol part by the depolymerized lignin oil or its derivatives in polyurethane synthesis.

It is our understanding that there is no prior art on the use of structures represented by Formula I in polyurethane synthesis, neither on the functionalization of those structures for use in a subsequent polyurethane synthesis.

It is accordingly an object of the present invention to provide the use of depolymerized lignin oil containing the lignin derived monomers of Formula (I) as chain extenders or chain stoppers in the synthesis of polyurethanes. As will be further detailed hereinafter and dependent on the further reagents being used said polyurethanes could either be a thermosetting or a thermoplastic polyurethane, with a particular focus on the synthesis of thermosetting polyurethanes.

SUMMARY OF THE INVENTION

Depolymerization of lignin can lead to lignin oils containing 4-hydroxyalkylphenol and/or 4-alkylphenol monomers described in Formula Ia. 4-hydroxyalkylphenol and 4-alkylphenol monomers can be functionalized to convert the aromatic OH into an aliphatic OH. 4-hydroxyalkylphenols or the product of their derivatization (Formula Ib) can be used as short-chain diols (also termed chain extenders) in the synthesis of polyurethanes. 4-alkylphenols or the product of their derivatization (Formula Ib) can be used as chain stoppers in the synthesis of polyurethanes. The other components of the depolymerized lignin oil (e.g. dimers, trimers and oligomers) will act as cross-linkers in the synthesis of thermosetting polyurethanes.

Besides the lignin derived components, the polymerization reaction mixture includes an isocyanate; in particular a di-isocyanate and optionally a diol or polyol. Optionally, said composition also comprises an additional chain extender. Optionally, one or more catalyst are added. By varying the type and ratio of the different reagents used in the polymerization reaction, fine tuning of the chemical and physical properties of the polyurethane can be obtained. The range of polyurethanes obtainable with the method of this invention covers polyurethanes ranging from rigid thermosetting polyurethanes to thermoplastic polyurethanes. The method to synthesize the polyurethane(s) according to the invention may be conducted utilizing conventional processing equipment, catalysts, and processes. In this process various components might be bio-based. The polyurethanes based on lignin derived monomers of Formula (I) can serve as a replacement of petroleum-based polyurethane, enabling the synthesis of fully or partially bio-based polyurethanes.

The standard polymerization techniques can be used in the synthesis of polyurethanes from depolymerized lignin oil containing monomers as herein defined. These include foam production, moulding, reaction extrusion, batch processing, solution polymerization, reaction injection molding and cast polymerization.

In one embodiment the present invention provides a polyurethane synthesized from lignin-derived monomers. In the manufacture of the polyurethanes according to the invention said lignin-derived monomers can be used in purified form or as a composition comprising depolymerized lignin, said composition containing one or several lignin-derived monomers. Hence in one embodiment the present invention is directed to a polyurethane comprising the reaction product of a composition comprising depolymerized lignin containing lignin-derived monomers according to Formula (I) with an isocyanate:

Formula I

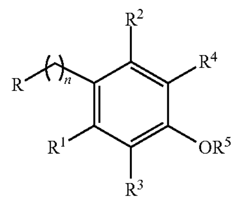

Wherein:

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$alkyl; more in particular H or $OCH_3$;

$R^5$ represents H or hydroxyalkyl; in particular hydroxy-$C_{1-12}$alkyl; and n=0-3.

The isocyanate used in the synthesis of the polyurethanes from the lignin-derived monomers can be selected from the group comprising an aromatic di-isocyanate, an aliphatic di-isocyanate, a cycloaliphatic di-isocyanate or a mixture of any of them.

In a particular embodiment the lignin-derived monomers used in the synthesis of the polyurethanes are monomers resulting from depolymerization of lignin according to formula (Ia)

Formula (Ia)

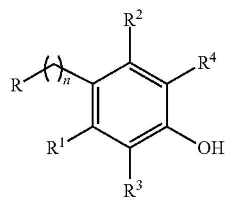

Wherein:

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$alkyl; more in particular H or $OCH_3$; and n=0-3.

In another particular embodiment the lignin-derived monomers used in the synthesis of the polyurethanes are monomers resulting from depolymerization of lignin according to formula (Ib)

Formula Ib

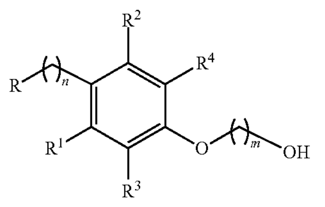

Wherein:

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$ alkyl; more in particular H or $OCH_3$;

n=0-3; and m=1-12.

When prepared from a composition comprising depolymerized lignin, said composition preferably comprises at least in 10% weight of the lignin-derived monomers according to any one of formulas (I), (Ia) or (Ib).

Thus in one particular embodiment the polyurethanes according to the invention are prepared from a composition which comprises at least in 10% by weight of monomers resulting from depolymerization of lignin according to formula (Ia) with an isocyanate.

In another particular embodiment the polyurethanes according to the invention are prepared from a composition which comprises at least in 10% by weight of monomers resulting from depolymerization of lignin according to formula (Ib) with an isocyanate.

In one embodiment the composition comprising at least 10% by weight of the lignin-derived monomers according to any one of formulas (I), (Ia) or (Ib), used in the synthesis of the polyurethanes according to the invention is a depolymerized lignin oil with at least 10% and up to about 90% by weight of said lignin-derived monomers. In a preferred embodiment a depolymerized lignin oil with at least 10% and up to about 90% by weight of lignin-derived monomers according to Formula (Ia) is used.

In addition to the mere polymerization reaction of the lignin-derived monomers as defined herein, further reagents could be included in the reaction mixture, such as polyhydroxy compounds and/or further additives. Thus in one embodiment the polyurethanes according to the invention comprise the reaction product of a composition comprising (a) depolymerized lignin containing one or more lignin-derived monomers according to any one of Formulas (I), (Ia) or (Ib); (b) an isocyanate; (c) optionally one or more polyhydroxy compounds, and (d) optionally one or more additives.

Through the addition of the polyhydroxy compounds in the reaction mixture which further contains the lignin-derived monomers and the isocyanate, the polyurethanes obtained could have thermoset characteristics. It is accordingly an object of the present invention to provide thermosetting polyurethane comprising the reaction product of a composition comprising (a) depolymerized lignin containing one or more lignin-derived monomers according to any one of Formulas (I), (Ia) or (Ib); (b) an isocyanate; (c) optionally one or more polyhydroxy compounds, and (d) one or more additives, if desired. In the synthesis of such thermosetting polyurethane the polyhydroxy compounds are in particular polyols with a OH functionality higher than two, i.e. with a OH functionality greater than two. In the synthesis of such thermosetting polyurethane the polyhydroxy compound is preferably selected from a polyether polyol, a polyester polyol, a polyacrylated polyol, a polycarbonate polyol, a polysiloxane polyol or mixtures thereof, with the afore mentioned polyols having a molecular weight from 200 to 8000. In the synthesis of such thermosetting polyurethane the NCO:active hydrogen ratio ranges preferably from 4 to 0.75, more preferably from 2 to 0.95, most preferably from 1.5 to 0.75.

By controlling the cross-linking ability of the reagents used in the synthesis of polyurethanes from lignin-derived monomers as defined herein, the polyurethane thus obtain can either be a thermosetting polyurethane or a thermoplastic polyurethane. Similar to the thermosetting materials, also in this synthesis of thermoplastic polyurethanes further reagents could be included, such as polyhydroxy compounds and/or further additives, but instead of polyhydroxy compounds with a functionality higher than two, use is made of polyhydroxy compounds with a OH functionality equal to two; in particular selected from a polyol, a polyether polyol, a polyester polyol, a polyacrylated polyol, a polycarbonate polyol, a polysiloxane polyol or mixtures thereof, with a molecular weight from 200 to 8000. Thus in one embodiment the present invention provides a thermoplastic polyurethane comprising the reaction product of a composition comprising (a) depolymerized lignin containing lignin-derived monomers according to any one of Formulas (I), (Ia) or (Ib); (b) an isocyanate; (c) one or more polyhydroxy compounds, and (d) additives, if desired; wherein the one or more polyhydroxy compounds are polyhydroxy compounds with a OH functionality equal to two; in particular selected from a polyether polyol, a polyester polyol, a polyacrylated polyol, a polycarbonate polyol, a polysiloxane polyol or mixtures thereof, with a molecular weight from 200 to 8000.

In the synthesis of the thermoplastic polyurethanes according to the invention the reagents could further include an additional chain extender selected from the group consisting of diols, diamines, and combinations thereof wherein the diols or diamines are compounds with 2 to 12 carbon atoms, i.e. the reaction composition could further comprise an additional chain extender selected from the group consisting of diols, diamines, and combinations thereof wherein the diols and diamines are compounds with 2 to 12 carbon atoms. In the synthesis of the thermoplastic polyurethanes as herein provided, the NCO:active hydrogen ratio ranges preferably from 1 to 0.2, more preferably from 1 to 0.5, most preferably from 0.9 to 0.4.

In the synthesis of the polyurethanes according to the invention, the reaction mixture may further comprise a catalyst; in particular one or more tertiary amines, such as but not limited to triethylamine; triethylenediamine; dimethylcyclohexylamine; N-methylmorpholine; N-ethylmorpholine; N,N,N',N'-tetramethylethylenediamine; N,N,N',N'-tetraethylethylenediamine; N,N-dimethylethanolamine; N,N-diethylethanolamine; N,N'-dimethylpiperazine; N,N, N',N'-tetramethylguanidine; N,N,N',N'-tetramethyl-1,3-butanediamine; 2-(dimethylaminoethoxy)ethanol diazabicyclo [2.2.2]octane and mixtures thereof.

In said instances where the reaction mixture contains polyhydroxy compounds, the molar ratio of polyol to lignin-derived monomers of any one of formulas (I), (Ia), or (Ib) in the reaction mixture preferably ranges from 10:100 to 90:10, preferably from 05:95 to 80:20, more preferably from 10:90 to 70:30.

Relying on lignin based materials, one, several or all components forming the polyurethanes (PU's) according to the invention could be or are bio-based. The polyurethanes as described herein could be obtained by reaction extrusion, batch processing, solution polymerization, reaction injection molding and cast polymerization; and can be used in different applications, mainly as a replacement of petroleum-based thermoplastic polyurethanes.

DETAILED DESCRIPTION OF THE INVENTION

Figure 1A:
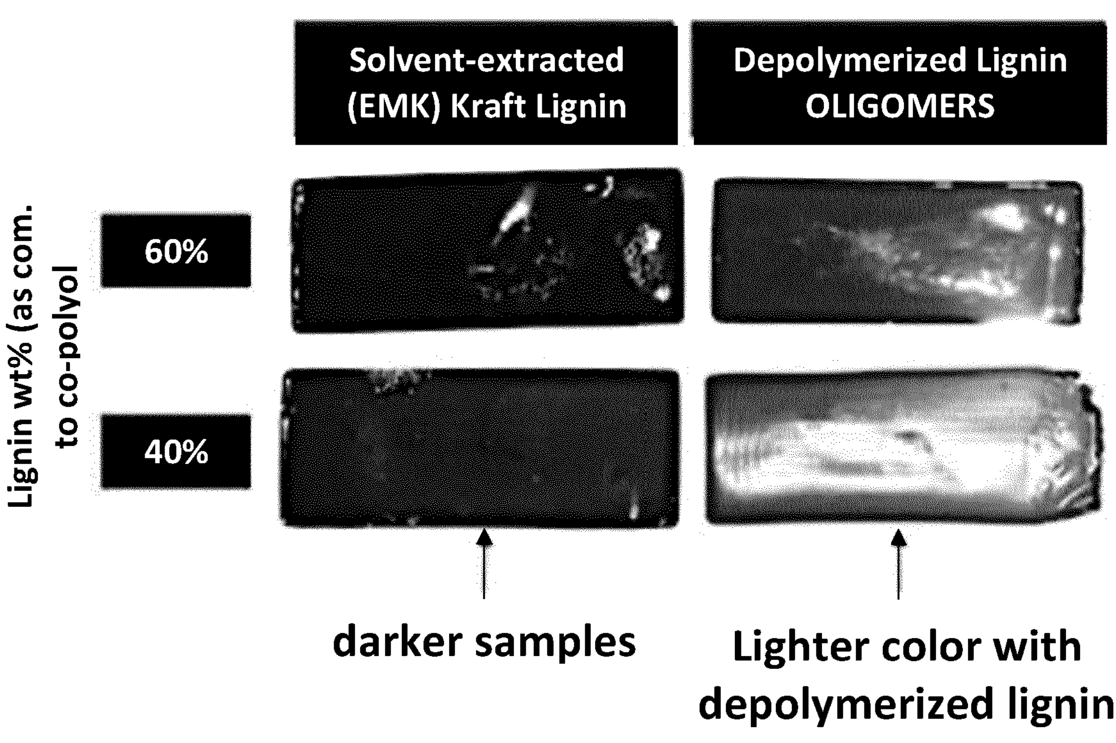
FIG. 1A is an illustration that depolymerized lignin oil results in polyurethane materials lighter in color than when solvent extracted Kraft lignin is used, at the same content of lignin.

The polyurethanes of the present invention include lignin-derived monomers, or the products of their respective functionalization, commonly referred to as the lignin-derived monomers according to any one of Formulas (I), (Ia) or (Ib). In this invention, said lignin-derived monomers function as short-chain diols (also termed chain extenders) or chain stoppers. Whereas lignin-derived monomers according to the invention will act as chain extenders (in particular the 4-hydroxyalkylphenols (Ia) or functionalized 4-hydroxyalkylphenols (Ib) being the products of their derivatization) or chain stoppers (in particular the 4-alkylphenols (Ia) or functionalized 4-alkylphenols (Ib) being the products of their derivatization), whereas other components of the depolymerized lignin oil (dimers, trimers and oligomers) will act as cross-linking agents. The ratio of chain extenders (monomers) to cross-linking agents (dimers, trimers and oligomers) contained in the polyurethane will determine the properties of the polyurethane, i.e. whether it is thermoplastic or thermosetting. The polyurethane includes the reaction product of a composition comprising lignin-derived monomers according to any one of Formulas (I), (Ia) or (Ib) with an isocyanate. Being a particular object of the present invention to provide the synthesis of a thermoset lignin-derived polyurethanes, the polyurethane will include the reaction product of an isocyanate and a composition comprising lignin-derived monomers according to any one of Formulas (I), (Ia) or (Ib), as well as lignin derived dimers, trimers and oligomers.

Hence, in a first embodiment the present invention provides a polyurethane comprising the reaction product of a composition comprising lignin-derived monomers according to any one of Formulas (I), (Ia) or (Ib) with an isocyanate. In another embodiment the present invention provides a method for the synthesis of a polyurethane, said method comprising reacting a composition comprising lignin-derived monomers according to any one of Formulas (I), (Ia) or (Ib) with an isocyanate.

The composition comprising the lignin-derived monomers could for example be a depolymerized lignin oil comprising lignin-derived dimers, trimers and oligomers. In said instance, and for use in the synthesis of a thermoset polyurethane such oil comprises at least 10% by weight of lignin-derived monomers according to any one of Formulas (I), (Ia) or (Ib). Thus in another embodiment the present invention provides a thermosetting polyurethane, wherein said thermosetting polyurethane comprises the reaction product of an isocyanate composition; and a depolymerized lignin oil composition containing at least 10% by weight of lignin-derived monomers according to any one of Formulas (I), (Ia) or (Ib). In an embodiment the present invention provides a method for the synthesis of a thermosetting polyurethane, said method comprising reacting a depolymerized lignin oil comprises at least 10% by weight of lignin-derived monomers according to any one of Formulas (I), (Ia) or (Ib) with an isocyanate.

The composition comprising the lignin-derived monomers, dimers, trimers and oligomers can be used for the synthesis of a thermoplastic polyurethane. In this case, the adjustment of NCO/OH ratio is necessary, so that the equivalents of NCO are lower than those of OH to prevent cross-linking.

Instead of departing from depolymerized lignin oils comprising the conventional amounts of lignin-derived monomers according to formula I resulting from the lignin depolymerisation, enriched fractions with up to 90% by weight; in particular from about 50% up to about 90% by weight; more in particular from about 70% to about 90% by weight of lignin-derived monomers of any one of formula (I), (Ia) or (Ib) can be used. In a second embodiment the present invention provides a polyurethane comprising the reaction product of a composition comprising up to 90% by weight of lignin-derived monomers according to any one of Formulas (I), (Ia) or (Ib) with an isocyanate. In another embodiment the present invention provides a method for the synthesis of a polyurethane, said method comprising reacting a composition comprising up to 90% by weight; in particular from about 50% up to about 90% by weight; more in particular from about 70% to about 90% by weight of lignin-derived monomers according to according to any one of Formulas (I), (Ia) or (Ib) with an isocyanate. As already mentioned herein before, by using these enriched fractions in isolation, cross-linking may be reduced, and the polyurethanes thus obtained will have a more elastomeric/rubber like behavior.

In each of the foregoing embodiments further reagents can be used in the synthesis of the polyurethanes according to the invention. Such further reagents include chain extenders (short chain diols, diamines or combinations thereof); a polyol; one or more additives and a catalyst. Of said further reagents the polyols include long chain diols, also known as polymeric diols in the field of polyurethane synthesis.

In one embodiment the polyurethane according to the invention comprises the reaction product of a composition comprising (a) a depolymerized lignin oil comprising lignin-derived monomers according to any one of Formulas (I), (Ia) or (Ib); (b) an isocyanate; (c); (d) optionally a polyol; (e) optionally a chain extender and (f) optionally additives. The polyol to depolymerized lignin ratio is not critical to the invention, but ranges preferably from 0:100 to 90:10% weight, more preferably 05:95 to 80:20% weight, most preferably 10:90 to 70:30% weight. It is also an embodiment of the present invention to provide a method for the synthesis of a polyurethane, said method comprising reacting a composition comprising (a) a depolymerized lignin oil comprising lignin-derived monomers according to any one of Formulas (I), (Ia) or (Ib); (b) optionally a polyol; (c) optionally a chain extender and (d) optionally additives; with an isocyanate. The polyol to depolymerized lignin ratio ranges preferably from 0:100 to 90:10% weight, more preferably 05:95 to 80:20% weight, most preferably 10:90 to 70:30% weight. Comprising besides lignin-derived monomers, also lignin derived dimers, trimers and oligomers, the use of such depolymerized lignin oil, typically provides thermoset polyurethanes. The higher the amount of lignin-derived monomers according to any one of Formulas (I), (Ia) or (Ib), lesser cross-linking will occur and the more thermoplastic the characteristics of the polyurethanes obtained.

The use of non-enriched depolymerized lignin oil comprising at least 10% by weight of lignin-derived monomers according to any one of Formulas (I), (Ia) or (Ib); will provide thermoset polyurethanes The invention accordingly provides in a third embodiment a thermoset polyurethane comprising the reaction product of a composition comprising (a) a depolymerized lignin oil with at least 10% by weight; in particular up to about 50% by weight; more in particular up to about 70% by weight of lignin-derived monomers according to any one of Formulas (I), (Ia) or (Ib); (b) an isocyanate; (c) optionally a polyol; (d) optionally a chain extender and (e) optionally additives. The polyol to depolymerized lignin ratio is not critical to the invention and ranges preferably from 0:100 to 90:10% weight, more preferably 05:95 to 80:20% weight, most preferably 10:90 to 70:30% weight. Similar to the above described method for the synthesis of a polyurethane, said method comprises reacting a composition comprising (a) a depolymerized lignin oil with at least 10% by weight; in particular up to about 50% by weight; more in particular up to about 70% by weight of lignin-derived monomers according to any one of Formulas (I), (Ia) or (Ib); (b) optionally a polyol; (c) optionally a chain extender and (d) optionally additives; with an isocyanate. The polyol to depolymerized lignin weight ratio ranges preferably from 0:100 to 90:10% by weight, more preferably 05:95 to 80:20% by weight, most preferably 10:90 to 70:30% by weight.

In a further embodiment the present invention provides a polyurethane comprising the reaction product of a composition comprising (a) a depolymerized lignin oil with at least 10% and up to 90% by weight of lignin-derived monomers according to any one of Formulas (I), (Ia) or (Ib); (b) an isocyanate; (c) optionally a polyol; (d) optionally a chain extender and (e) optionally additives. The polyol to depolymerized lignin ratio ranges preferably from 0:100 to 90:10% weight, more preferably 05:95 to 80:20% weight, most preferably 10:90 to 70:30% weight. As well as a method for the synthesis of a polyurethane, said method comprising reacting a composition comprising (a) a depolymerized lignin oil with at least 10% and up to about 90% weight of lignin-derived monomers according to any one of Formulas (I), (Ia) or (Ib); (b) optionally a polyol; (c) optionally a chain extender and (d) optionally additives; with an isocyanate. The polyol to depolymerized lignin ratio ranges preferably from 0:100 to 90:10% weight, more preferably 05:95 to 80:20% weight, most preferably 10:90 to 70:30% weight.

In another embodiment the invention provides a thermoset polyurethane comprising the reaction product of a composition comprising (a) a depolymerized lignin oil with at least 10% and up to 90% weight of lignin-derived monomers according to any one of Formulas (I), (Ia) or (Ib); (b) an isocyanate; (c) optionally a polyol; (d) optionally a chain extender and (e) optionally additives. The polyol to depolymerized lignin ratio ranges preferably from 0:100 to 90:10% weight, more preferably 05:95 to 80:20% weight, most preferably 10:90 to 70:30% weight. As well as a method for the synthesis of a polyurethane, said method comprising reacting a composition comprising (a) a depolymerized lignin oil with at least 10% and up to 90% weight of lignin-derived monomers according to any one of Formulas (I), (Ia) or (Ib); (b) optionally a polyol; (c) optionally a chain extender and (d) optionally additives; with an isocyanate. The polyol to depolymerized lignin ratio ranges preferably from 0:100 to 90:10% weight, more preferably 05:95 to 80:20% weight, most preferably 10:90 to 70:30% weight. The NCO:active hydrogen ratio ranges preferably from 4 to 0.75, more preferably from 2 to 0.95, most preferably from 1.5 to 0.75.

In another embodiment the invention provides a thermoplastic polyurethane comprising the reaction product of a composition comprising (a) a depolymerized lignin oil with at least 10% and up to 90% weight of lignin-derived monomers according to to any one of Formulas (I), (Ia) or (Ib); (b) an isocyanate; (c) optionally a polyol; (d) optionally a chain extender and (e) optionally additives. The polyol to depolymerized lignin ratio ranges preferably from 0:100 to 90:10% weight, more preferably 05:95 to 80:20% weight, most preferably 10:90 to 70:30% weight. As well as a method for the synthesis of a polyurethane, said method comprising reacting a composition comprising (a) a depolymerized lignin oil with at least 10% and up to 90% weight of lignin-derived monomers according to any one of Formulas (I), (Ia) or (Ib); (b) optionally a polyol; (c) optionally a chain extender and (d) optionally additives; with an isocyanate. The polyol to depolymerized lignin ratio ranges preferably from 0:100 to 90:10% weight, more preferably 05:95 to 80:20% weight, most preferably 10:90 to 70:30% weight. The NCO:active hydrogen ratio ranges preferably from 1 to 0.2, more preferably from 1 to 0.5, most preferably from 0.9 to 0.4.

In each of the above-described embodiments, by varying the type and ratio of the different reagents fine tuning of the chemical and physical properties of the TPU can be obtained. The method for to synthesize the TPU may be conducted utilizing conventional processing equipment, catalysts, and processes. In this process the different components might be bio-based.

Isocyanate Composition

In one embodiment, the isocyanate suitable for synthesizing the polyurethane according to the invention may be any of the isocyanates previously disclosed as suitable for the preparation of polyurethanes, and includes aliphatic, aromatic and cycloaliphatic di-isocyanates, and mixtures thereof.

Illustrative di-isocyanates include, but are not limited to methylenebis(phenyl isocyanate) including the 4,4'-isomer, the 2,4'-isomer and mixtures thereof; 2,4- and 2,6-toluene di-isocyanate and mixtures thereof; m- and p-phenylene di-isocyanates; chlorophenylene di-isocyanates; a,a'-xylylene di-isocyanate; o-tolidine di-isocyanate; 1,5-naphthalene di-isocyanate; hexamethylene 1,6-di-isocyanate; pentamethylene 1,5-di-isocyanate, 1,4-butane di-isocyanate; isophorone di-isocyanate; methylenebis(cyclohexyl isocyanate) including the 4,4'-isomer, the 2,4'-isomer and mixtures thereof; cyclohexylene di-isocyanates (1,2-; 1,3-; or 1,4- and mixtures thereof). Also included are the modified forms of methylenebis(phenyl isocyanate) that enable them to be stable liquids at ambient temperature. Dimers and trimers of the above di-isocyanates may also be used in the polyurethane synthesis.

More preferably, the di-isocyanates are selected from methylenebis(phenyl isocyanate) including the 4,4'-isomer, the 2,4'-isomer, and mixtures thereof; 2,4- and 2,6-toluene di-isocyanate and mixtures thereof; hexamethylene 1,6-di-isocyanate; pentamethylene 1,5-di-isocyanate, methylenebis (cyclohexyl isocyanate) including the 4,4'-isomer, the 2,4'-isomer and mixtures thereof.

The overall equivalent ratio of the total di-isocyanate to the total equivalent of the active hydrogen containing components (the lignin-derived monomers the optional further short-chain diol chain extender and the optional long-chain polyol and the optional cross-linking agent (infra)) will determine, together with the monomer content and type, the class of polymer that is obtained. For thermosets, the NCO: active hydrogen ratio ranges preferably from 4 to 0.25, more preferably from 2 to 0.5, most preferably from 1.5 to 0.75. For thermoplastics, the NCO:active hydrogen ratio ranges preferably from 2 to 0.2, more preferably from 1 to 0.3, most preferably from 0.9 to 0.4.

The compositions comprising the lignin-derived monomers according to any one of Formulas (I), (Ia) or (Ib)

Being an objective of the present invention in providing a bio-based source of building blocks in the synthesis of polyurethanes, the compositions comprising the lignin-derived monomers according to any one of Formulas (I), (Ia) or (Ib), will typically be based on depolymerized lignin oils. Evidently, the overall constituent of the composition of monomers in the depolymerized lignin will depend on the type of lignocellulose that is chosen as starting material and on the depolymerization conditions and reactions. Some types of depolymerization methods, especially reductive catalytic methods, allow the obtention of 4-hydroxylalkylphenols and/or 4-alkylphenols in good yields (up to 50% weight). The selectivity towards 4 hydroxylalkylphenols or 4-alkylphenols is determined by the conditions of depolymerization, for example by the type of catalyst used for the depolymerization. Typically, the 4 hydroxylalkylphenols and/or 4-alkylphenols are obtained as mixture of monomers (Formula Ia), with independent variation in positions $R^1$, $R^2$, $R^3$ and $R^4$. The most prevalent monomers are the 4-hydroxylalkylphenols and/or 4-alkylphenols monomers (Formula Ia) wherein $R^1$ and $R^2$═H; $R^3$═$OCH_3$; $R^4$═H or $OCH_3$; n=3. R═OH or $CH_3$. Such mixtures of monomers can be used in the described protocol, and thus the description of $R^1$ and $R^2$ as independently H or $CH_3$ and $R^3$ and $R^4$ as independently H or $OCH_3$. Besides monomers, the depolymerization of lignin results in higher molecular weight molecules (dimers, trimers, and oligomers). Depolymerized lignin oils, with at least 10% of 4-hydroxylalkylphenols and/or 4-alkylphenols monomers (Formula Ia) can be used in polyurethane synthesis. The dimers, trimers and oligomers will act as branching elements, leading to a branched or partially cross-linked polymer.

It has surprisingly been found that the polyurethanes obtained from depolymerized lignin oligomers have completely different characteristics than lignin-based polyurethanes made from technical lignin (Kraft Lignin). Kraft lignin has higher molecular weight than lignin oils, higher polydispersity and lower functionality (less aliphatic OH groups, less uncondensed aromatics and more condensed aromatics) (Table 1). Kraft lignin is a powder while depolymerized lignin oil is a flowing liquid. This requires the need of DMF for making polyurethanes (*Ind. Crop. Prod.* 2019, 141, 111655). Kraft lignin has poor solubility in the common polyols and therefore it needs solvent for blending it. Depolymerized lignin oils is more miscible with common polyols used in polyurethane synthesis such as polypropylene glycol or polytetrahydrofuran. The characteristics of depolymerized lignin oil result in advantages during the production of the polyurethanes as well as in the properties of the products.

The largest advantage of using depolymerized lignin is that it allows larger percentage of polyol substitution. It is difficult to make polyurethanes with more than 30% of polyol substitution using Kraft lignin (*Ind. Crop. Prod.* 2019, 141, 111655 and references therein). On the contrary, the use of depolymerized lignin allows up to complete substitution of the polyol. This, in turn, allows obtaining stiffer materials, as shown by the Storage modulus (table 3). The mechanical properties are better than those shown by polyurethanes made from Kraft lignin (*Ind. Crop. Prod.* 2019, 141, 111655).

Further, the homogeneity is better, both during the manufacture of the resins and of the final products. When using (solvent extracted) Kraft lignin, typically particles are formed, which need to be filtered off. The better homogeneity of the final product can be determined by the peak width at half height.

The better miscibility of depolymerized lignin oil allows the use of greater amount of solvents (dichloromethane, ethyl acetate, methanol, ethanol, butanol, acetone, ethyl methyl ketone) than Kraft lignin, which is only soluble in tetrahydrofuran, dimethylformamide, dimethylsulfoxide. Furthermore, the better compatibility of depolymerized lignin oil with the other components of the formulation allows the use of less amount of solvent or even complete avoidance of it.

Finally, by tuning the content of lignin, the lignin type, the polyol, the isocyanate and the NCO/OH ratio a very broad range of properties can be obtained, as shown in Table 3.

Depolymerized lignin oil results in polyurethane materials lighter in color than when (solvent extracted) Kraft lignin is used, at the same content of lignin (FIG. 1A).

Figure 1B:
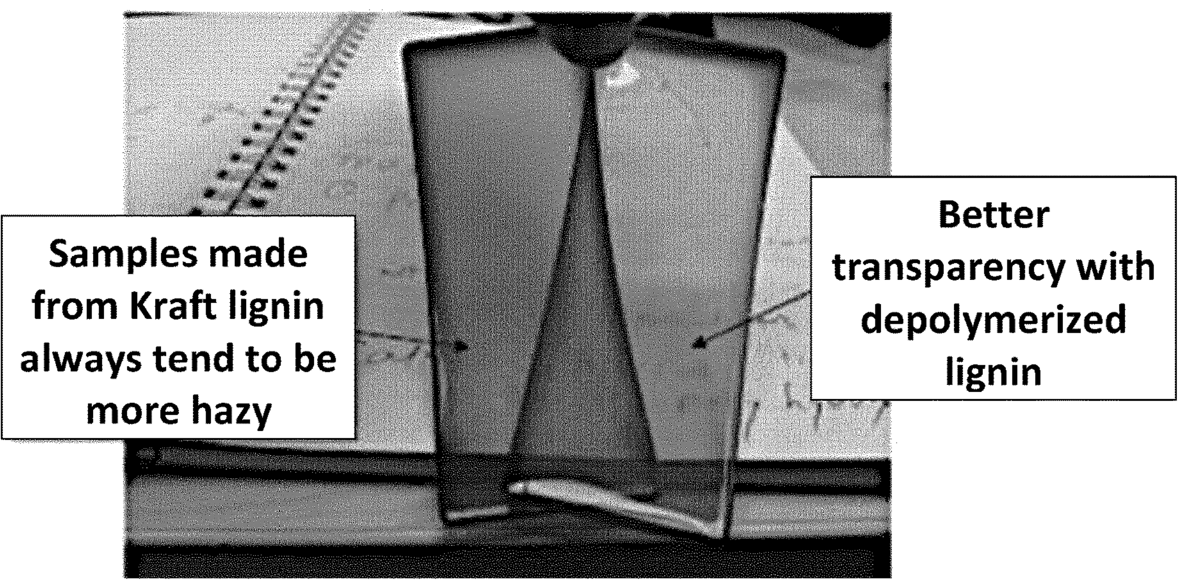
FIG. 1B is an illustration that transparency of materials synthesized from depolymerized lignin oil are more transparent than those made from solvent extracted Kraft lignin.

The transparency of the materials synthesized from depolymerized lignin oil are more transparent than those made from (solvent extracted) Kraft lignin (FIG. 1B).

The depolymerized lignin oil as a whole, as well as the monomers extracted from it, can be functionalized to convert the phenolic hydroxyl groups of the 4-hydroxylalkylphenols and/or 4-alkylphenols (Formula Ia) into aliphatic hydroxyl groups (Formula Ib). This reaction can be performed with different chemicals, such as but not limited to: cyclic ethers such as ethylene oxide, propylene oxide, butylene oxide, tetrahydrofuran, 5-methyl-tetrahydrofuran; cyclic carbonates such as ethylene carbonate and propylene carbonate; haloalcohols such as 2-chloroethanol, 2-iodoethanol, 3-chloro-1-propanol, 3-bromo-1-propanol and 4-chlorobutanol, 5-bromo-1-pentanol, 6-chlorohexanol, 8-chloro-1-octanol, 10-chloro-1-decanol.

The selective functionalization of phenolic hydroxyl group can be achieved in different ways. One option is by using a base that will deprotonate the phenolic hydroxyl but not the aliphatic hydroxyl. Examples of common bases that meet this criteria include, but are not limited to: ammonia, metal hydroxides $M(OH)_x$, preferentially alkali metal hydroxides (such NaOH or KOH); carbonate salts with the formula $M_x(CO_3)_y$ (such as $Na_2CO_3$ or $K_2CO_3$).

When the 4-hydroxyalkylphenols and/or 4-alkylphenols in formula Ia are modified according to the above listed procedure the functionalized 4-hydroxyalkylphenols and/or 4-alkylphenols monomers from formula Ib will be obtained.

Formula Ia

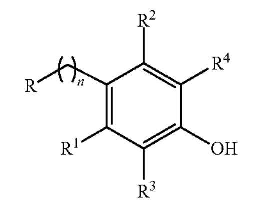

4-hydroxyalkylphenols (R = OH)
4-alkylphenols (R = $CH_3$)

Formula Ib

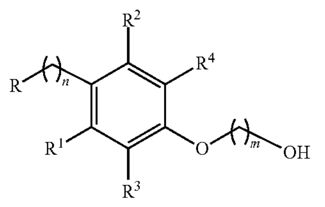

Functionalized 4-hydroxyalkylphenols (R = OH)
Functionalized 4-alkylphenols (R = $CH_3$)

Wherein;

R represents OH or $CH_3$;

$R^1$ and $R^2$ independently represent H or alkyl; in particular H or $C_{1-6}$alkyl; more in particular H or $CH_3$;

$R^3$ and $R^4$ independently represent H or oxy-alkyl; in particular H or oxy-$C_{1-6}$alkyl; more in particular H or $OCH_3$;

n=0-3;

m=1-12

In one embodiment, the lignin-derived monomers might be transformed to aminoalcohols or diamines. These can also be used as chain extenders in PU synthesis.

Preferably the polyhydroxy compounds, include polymeric polyol compound as further detailed below, having a molecular weight between 200 and 10,000. The molar ratio of polyol to lignin-derived monomers of any one of formulas (I), (Ia) or (Ib) ranges preferably from 0:100 to 90:10, more preferably 05:95 to 70:30, most preferably 10:90 to 70:30. Thus in a preferred embodiment the present invention provides a thermoset polyurethanes obtained by reaction of the lignin-derived monomers according to any one of formulas (I), (Ia) or (Ib) with an isocyanate; one or more polyhydroxy compounds, and at least one trihydroxy compound acting as cross-linking agent; wherein the molar ratio of polyol to lignin-derived monomers of any one of formulas (I), (Ia) or (Ib) ranges from 10:100 to 90:10, preferably from 05:95 to 70:30, more preferably from 10:90 to 70:30.

The Additional Chain Extender

In each of the foregoing embodiments, an additional chain extender; in particular short-chain extenders might be added when the depolymerized lignin oils comprising the lignin derived monomers according to any one of formulas (I), (Ia) or (Ib) or when the lignin derived monomers of formulas (I), (Ia) or (Ib) are used for the synthesis of PU's. Chain extenders are preferably meant for the formulations targeting thermoplastic polyurethanes, where the short-chain extenders form the hard phase, while the polyols form soft phase. In such instances the molar ratio of the (functionalized) lignin-derived monomer to the additional chain extender might between 99:1 to 1:99, preferably between 90:10 and 10:90, most preferably between 80:20 and 20:80. Additional chain extenders comprises diols, diamines, and combinations thereof with 2 to 12 carbon atoms.

Illustrative chain extenders include, but are not limited to ethylene glycol; diethylene glycol, propylene glycol; dipropylene glycol; 1,4-butanediol; 1,6-hexanediol; 1,3-butanediol; 1,5-pentanediol; neopentylglycol; 2-ethyl-2-butyl-1,3-propanediol; 1,4-cyclohexanedimethanol; hexamethylenediol; heptanediol; nonanediol; dodecanediol; benzenedimethanol (1,2-; 1,3-; or 1,4- and mixtures thereof); bis(2-hydroxyethoxy)benzene (1,2-; 1,3-; or 1,4- and mixtures thereof); ethylenediamine; butanediamine; 1,2-propylene diamine; 1,6-hexamethylenediamine; piperazine; ethanolamine; N-methyl-diethanolamine; N-ethyldiethanolamine; N-phenylpropanolamine and mixtures thereof.

The Polyol

In each of the foregoing embodiments, a polyol might be any from the categories of polyether polyols, polyester polyols, polyacrylated polyols, polycarbonate polyols or polysiloxane polyols or mixtures thereof with a molecular weight preferably from 200 to 8000, more preferably from 300 to 6000 and most preferably from 400 to 4000. For thermoset polyurethanes the polyol is the main component together with the isocyanate. Depolymerized lignin oil substitutes, complete of partially, the polyol. For thermoplastic polyurethanes, there are two diols. Short-chain diols (also termed chain extenders) and long-chain diols (termed in TPU production polyols).

In one embodiment, the polyol may comprise a polyether polyol. Suitable polyether polyols may include polyether polyols derived from a diol or polyol reacted with an ether comprising an alkylene oxide, typically ethylene oxide, propylene oxide butylene oxide, amylene oxide, or mixtures thereof. Suitable initiators for the synthesis of polyether polyols include ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, glycol, 1,6-hexanediol, trimethylolpropane, 1,2,6-hexanetiol, gylcerine, sucrose, sorbitol, pentaerithriol, ethanolamine, toluenediamine and Mannich bases. Illustrative polyether polyols that might be used include, but are not limited to poly(ethylene glycol); poly(propylene glycol); poly(tetramethylene ether glycol), also known as poly-tetrahydrofuran; Suitable polyether polyols also include polyetheramines, especially diamines, and polyimide adducts such as the reaction product of ethylenediamine or triethanolamine and propylene oxide. Copolyethers from the reaction of tetrahydrofuran and ethylene oxide or propylene oxide might also be used in the invention. The polyether composition might include a mixture of polyethers.

In one embodiment, the polyol might comprise a polyester polyol. Polyesters polyols are produced either by an esterification reaction of one or more glycols with one or more dicarboxylic acids or anhydrides; or by transesterification reaction of one or more glycols with esters of dicarboxylic acids. The dicarboxylic acids of the desired polyester can be aliphatic, cycloaliphatic, aromatic, or combinations thereof. Illustrative examples of dicarboxylic acids include, but are not limited to: succinic, glutaric, adipic, pimelic, suberic, azelaic, sebacic, dodecanedioic, isophthalic, terephthalic, cyclohexane dicarboxylic and mixtures thereof. Anhydrides of the above dicarboxylic acids such as phthalic anhydride, tetrahydrophthalic anhydride and mixtures thereof can also be used. The glycols which are reacted to form a desirable polyester intermediate can be aliphatic, aromatic, or combinations thereof, including any of the glycols described above in the chain extender section. Illustrative examples include ethylene glycol; 1,2-propanediol; 1,3-propanediol; 1,3-butanediol; 1,4-butanediol; 1,5-pentanediol; 1,6-hexanediol; neopentylglycol; 1,4-cyclohexanedimethanol; decamethylene glycol; dodecamethylene glycol; 1,1,1-trimethylolpropane; 1,1,1-trimethylolethane; 1,2,6-hexanetriol; α-methyl glucoside; pentaerythritol; sorbitol and mixtures thereof.

In one embodiment, the polyol might comprise a polyacrylated polyols.

In one embodiment, the polyol might comprise a polycarbonate polyol. Polycarbonate polyols can be produced by reacting diols, such as propylene glycol, 1,4-butanediol or 1,6-hexenediol or mixtures of them with diarylcarbonates.

In one embodiment, the polyol might comprise a polysiloxane polyols. Polysiloxane polyols can be produced by the dehydrogenation reaction between a polysiloxane hydride and an aliphatic polyhydric alcohol or a polyoxyalkylene alcohol. Illustrative examples include alpha-omega-hydroxypropyl terminated poly(dimethysiloxane); alpha-omega-amino propyl terminated poly(dimethysiloxane); copolymers of poly(dimethysiloxane) materials with a poly (alkylene oxide).

Cross-Linking Agent

As mentioned hereinbefore, the cross-linking agent used in the synthesis of thermoset polyurethanes typically consist of polyols (e.g trihydroxy compounds) with higher functionality, i.e. higher than diol functionality. Such higher functional groups are already present when making use of depolymerized lignin oils in the synthesis of the lignin-derived PU's. Still even in these embodiments further cross-linking agents can be employed in case of a higher cross-linking demand of the final product. In particular such cross-linking agents are low molecular weight higher functional hydroxyl and amine terminated compounds; more in particular low molecular weight higher functional hydroxyl terminated compounds, such as glycerol; trimethylolpropane; 1,2,6-hexanetriol; and pentaerythritol.

Catalysts

Catalysts that accelerate the reaction between the isocyanate groups and the isocyanate-reactive groups (hydroxyl or amine) are not compulsory, but might be used. Two types of catalysts can be independently used. Tertiary amines, such as but not limited to triethylamine; triethylenediamine; dimethylcyclohexylamine; N-methylmorpholine; N-ethylmorpholine; N,N,N',N'-tetramethylethylenediamine; N,N,N',N'-tetraethyl ethylenediamine; N,N-dimethylethanolamine; N,N-diethylethanolamine; N,N'-dimethylpiperazine; N,N,N',N'-tetramethylguanidine; N,N,N',N'-tetramethyl-1,3-butanediamine; 2-(dimethylaminoethoxy)ethanol diazabicyclo [2.2.2]octane and mixtures thereof. Organic metal compounds, such as but not limited to stannous octoate; stannous oleate; lead octoate; dibutyltin dioctoate; dibutyltin diluarate; dibutyltin diacetate; iron(III) acetylacetonate; magnesium acetyl acetonate; bismuth neodecanoate and mixtures thereof. The amount of catalyst used is generally within the range of 0.0001 to 1.0 percent by weight of the total weight of the reactants.

Additives

Besides catalysts, customary auxiliaries and additives can also be added into the components, into the reaction mixture or after making the polyurethane. Examples of those include, but are not limited to flame retardants, antioxidants, nucleating agents, blowing agents, stabilizers against hydrolysis, light, heat, oxidation or discoloration, surface-active substances, lubricants and mold release agents, dyes and pigments, inhibitors, antimicrobial agents, impact modifiers, rheology modifiers, UV absorbers, inorganic and/or organic fillers, reinforcing materials and plasticizers. Chain regulators can be used optionally added. These compounds have only one functional group reactive toward isocyanates.

The polymerization techniques useful for making the polyurethanes of this invention include conventional methods, such as foam production, molding, extrusion, batch processing, solution polymerization, reaction injection molding and cast polymerization.

The (partially) bio-based polyurethanes can serve as a replacement of petroleum-based polyurethanes, for example but not limited to upholstery, automotive suspension bushings, bedding, automotive and truck seating, straps and bands, elastomeric wheels and tires, flexible foams for seating, rigid foams for insulation panels, microcellular foams seals and gaskets, electrical potting compounds, seals, gaskets, carpet underlay, hard plastic parts, sporting goods, medical devices, mobile electronic devices, keyboard protectors for laptops, automotive instrument panels, caster wheels, power tools, footwear, performance films, wire and cable jacketing, adhesive and textile coating applications and 3D printing

EXAMPLES

Two different depolymerized lignin were tested (Lignin 1-2) with different amount of dihydroconiferyl alcohol. Lignin 3 and 4 are a model of depolymerized lignin, constructed by mixing Kraft lignin extracted with ethyl methyl ketone with dihydroconiferyl alcohol (DCA) in 20% (Lignin 3) and 30% (Lignin 4). Lignin 5 is Kraft lignin extracted with ethyl methyl ketone. Lignin 6 is Kraft lignin, used as reference. The characterization of the lignins is provided in table 1.

TABLE 1

Characterization of lignins used

| Name | % DCA | GPC Mn (Da) | GPC Mw (Da) | GPC PDI | Hydroxyl groups (mmol/g) determined by 31P NMR: Aliphatic | Condensed aromatics | Uncondensed aromatics | Carboxylic acids |
|---|---|---|---|---|---|---|---|---|
| Lignin 1 | 22 | 401 | 540 | 1.345 | 4.50 | 0.94 | 2.79 | 0.16 |
| Lignin 2 | 10 | 671 | 1370 | 2.044 | 3.38 | 1.13 | 2.18 | 0.44 |
| Lignin 3 | 20 | 1140 | 2420 | 2.125 | 2.10 | 1.72 | 3.24 | 0.45 |
| Lignin 4 | 30 | 1130 | 2530 | 2.248 | 2.72 | 1.47 | 3.62 | 0.36 |
| Lignin 5 | 0 | 1020 | 2370 | 2.394 | 1.45 | 2.03 | 2.72 | 0.54 |
| Lignin 6 | 0 | 2252 | 5200 | 3.5 | 1.95 | 2.02 | 2.31 | 0.43 |

This table shows that the aliphatic OH content is directly related to the amount of DCA.

The synthesis of thermoset polyurethanes was done according to a general protocol: In a dried round bottom flask, the polyol (if present), the lignin and the catalyst were was dissolved in dry Ethyl methyl ketone. To this solution the isocyanate was added and reacted for one hour at. 40° C. The solution was filtered and poured into Teflon molds. The solvent was evaporated slowly overnight and the films were put into the oven at 100° C. for 7 h to complete curing.

The compositions of the thermoset polyurethanes are listed in Table 2 below. EcoN7300 is a bio-based pentamethylene di-isocyanate. HDI referes to Hexamethylene di-isocyanate and HDI trimer to Hexamethylene di-isocyanate trimer.

TABLE 2

| PU | Lignin | Lignin wt % in the polyol mix | Polyol | Isocyanate | NCO/OH |
|---|---|---|---|---|---|
| 1.1 | Lignin 1 | 50 | PPG725 | EcoN7300 | 1.05 |
| 1.2 | Lignin 1 | 75 | PPG725 | EcoN7300 | 1 |
| 1.3 | Lignin 1 | 75 | PPG725 | EcoN7300 | 1.2 |
| 1.4 | Lignin 1 | 70 | PPG725 | HDI trimer | 1 |
| 1.5 | Lignin 1 | 100 | — | EcoN7300 | 1.05 |
| 1.6 | Lignin 1 | 100 | — | EcoN7300 | 1.2 |
| 2.1 | Lignin 2 | 30 | PTHF650 | HDI trimer | 1.1 |
| 2.1 | Lignin 2 | 60 | PPG725 | HDI trimer | 1.3 |
| 3.1 | Lignin 3 | 60 | PTHF650 | HDI trimer | 1.1 |
| 3.2 | Lignin 3 | 100 | — | EcoN7300 | 1.1 |
| 4.1 | Lignin 4 | 30 | PTHF650 | EcoN7300 | 1.1 |
| 4.2 | Lignin 4 | 100 | — | HDI | 1.3 |
| 5.1 | Lignin 5 | 60 | PTHF650 | HDI trimer | 0.9 |
| 5.2 | Lignin 5 | 60 | PTHF650 | HDI trimer | 1.3 |

TABLE 3

Characterization of the thermoset polyurethanes made

| Sample | Glass transition by DMA (5° C./min, 1 Hz) T (° C.) at E" peak | T (° C.) at E' Onset | T (° C.) at Peak tan δ | Peak tan δ high | Peak width at half height (° C.) | By DSC (20° C./min) T (° C.) | Storage modulus at 25° C. by DMA E' (MPa) |
|---|---|---|---|---|---|---|---|
| 1.1 | 8.4 | 15.1 | 52.3 | 0.59 | 42.2 | 14 | 632 |
| 1.2 | 1.6 | 47.1 | 73.4 | 0.82 | 32.6 | n.d. | 1132 |
| 1.3 | 22.2 | 44.5 | 74.2 | 0.76 | 34.9 | n.d. | 1413 |
| 1.4 | 23.3 | 28.0 | 58.0 | 0.85 | n.d. | n.d. | 672 |
| 1.5 | 47.0 | 49.1 | 67.4 | 0.81 | 32.9 | 51 | 1510 |
| 1.6 | 54.6 | 53.6 | 72.7 | 0.80 | 33.4 | 41 | 1763 |
| 2.1 | −48.5 | −12.5 | 30.7 | 0.44 | 56.1 | −10 | 94 |
| 2.2 | −17.3 | 45.8 | 84.2 | 0.50 | 45.5 | 29 | 1014 |
| 3.1 | 35.7 | 39.9 | 78.7 | 0.38 | 58.7 | 34 | 1268 |
| 3.2 | 91.6 | 88.1 | 112.0 | 0.48 | 35.7 | 70 | 2281 |
| 4.1 | −31.7 | −3.2 | 45.8 | 0.34 | 64.8 | 9 | 268 |
| 5.1 | 0.2 | 37.2 | 84.6 | 0.41 | 58.9 | n.d. | 890 |
| 5.2 | 4.5 | 30.5 | 87.8 | 0.34 | 65.6 | n.d. | 917 |

The invention claimed is:

1. A polyurethane comprising a product of reacting an isocyanate with a composition comprising depolymerized lignin oil, the depolymerized lignin oil comprising from 10% by weight to about 90% by weight lignin-derived monomers according to Formula (I):

(I)

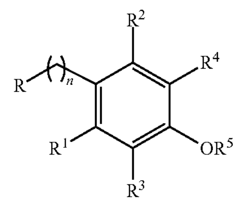

where:

R represents OH or $CH_3$;

$R^1$ and $R^2$ independently represent H or alkyl;

$R^3$ and $R^4$ independently represent H or oxy-alkyl;

$R^5$ represents H or hydroxyalkyl; and n is 0, 1, 2, or 3.

2. The polyurethane of claim 1, wherein the isocyanate comprises one or more di-isocyanates chosen from aromatic di-isocyanates, and/or aliphatic di-isocyanates, and/or cycloaliphatic di-isocyanates.

3. The polyurethane of claim 1, wherein $R^5$ is H.

4. The polyurethane of claim 1, $R^5$ represents $-(CH_2)_mOH$, where m is an integer from 1 to 12.

5. The polyurethane of claim 1, wherein the composition is a depolymerized lignin oil comprising from 10% by weight to about 90% by weight lignin-derived monomers according to Formula (I), where $R^5$ represents H or $-(CH_2)_mOH$, where m is an integer from 1 to 12.

6. The polyurethane according to claim 1, wherein the polyurethane is a thermosetting polyurethane.

7. The polyurethane according to claim 6, wherein:

the composition further comprises one or more polyhydroxy compounds and, optionally, one or more additives;

the one or more polyhydroxy compounds comprise polyols with a functionality greater than two; and the one or more polyhydroxy compounds are selected from polyols, polyether polyols, polyester polyols, polyacrylated polyols, polycarbonate polyols, polysiloxane polyols, or mixtures thereof, with a molecular weight from 200 Da to 8000 Da.

8. The polyurethane according to claim 7, wherein the composition has a molar ratio of polyols to lignin-derived monomers from 10:100 to 90:10.

9. The polyurethane according to claim 6, having an NCO:active-hydrogen ratio from 0.75 to 4.

10. The polyurethane according to claim 1, wherein the polyurethane is a thermoplastic polyurethane.

11. The polyurethane according to claim 10, wherein:

the composition further comprises one or more polyhydroxy compounds and, optionally, one or more additives; and the one or more polyhydroxy compounds comprise polyols with a functionality greater than two.

12. The polyurethane according to claim 11, wherein the one or more polyhydroxy compounds are selected from polyols, polyether polyols, polyester polyols, polyacrylated polyols, polycarbonate polyols, polysiloxane polyols, or mixtures thereof, with a molecular weight from 200 Da to 8000 Da.

13. The polyurethane according to claim 12, wherein the composition has a molar ratio of polyols to lignin-derived monomers from 10:100 to 90:10.

14. The polyurethane according to claim 10, wherein the composition further comprises a chain extender selected from the group consisting of a diol containing 2 to 12 carbon atoms, a diamine containing 2 to 12 carbon atoms, and a combination thereof.

15. The polyurethane according to claim 14, having an NCO:active-hydrogen ratio from 0.2 to 1.

16. The polyurethane according to claim 1, wherein the composition further comprises a catalyst.

17. The polyurethane according to claim 16, wherein the catalyst comprises one or more tertiary amines chosen from triethylamine; triethylenediamine; dimethylcyclohexylamine; N-methylmorpholine; N-ethylmorpholine; N,N,N',N'-tetramethylethylenediamine; N,N,N',N'-tetraethylethylenediamine; N,N-dimethylethanolamine; N,N-diethylethanolamine; N,N'-dimethylpiperazine; N,N,N',N'-tetramethylguanidine; N,N,N',N'-tetramethyl-1,3-butanediamine; 2-(dimethylaminoethoxy) ethanol diazabicyclo[2.2.2]octane, or combinations thereof.

18. The polyurethane according to claim 1, comprising a reaction product of:

(a) the isocyanate;

(b) the composition;

(c) optionally, one or more polyhydroxy compounds; and (d) optionally, one or more additives, wherein at least one of (a), (b), (c), and (d) are bio-based.

19. The polyurethane according to claim 18, wherein all of (a), (b), (c), and (d) are bio-based.

* * * * *